March 27, 1962  R. G. HILL ET AL  3,026,720

PURE BENDING TEST MACHINE

Filed Feb. 24, 1959   3 Sheets-Sheet 1

INVENTOR.
RONALD G. HILL
EDWIN J. ZAPEL

BY Barnes & Seed

ATTORNEYS

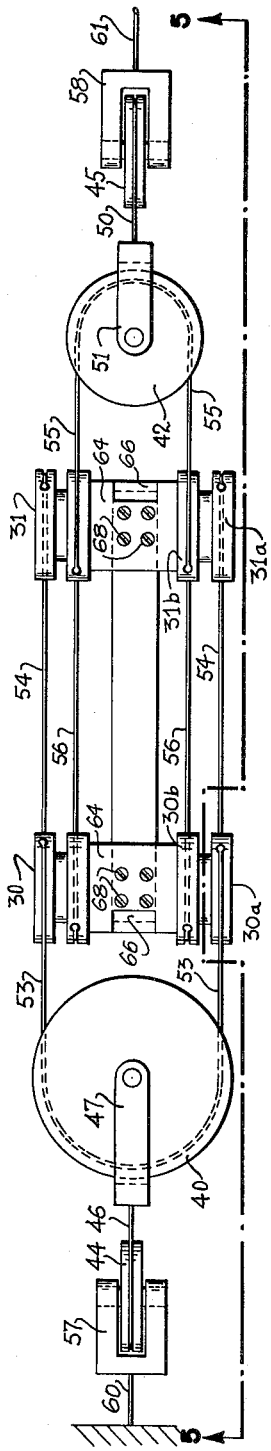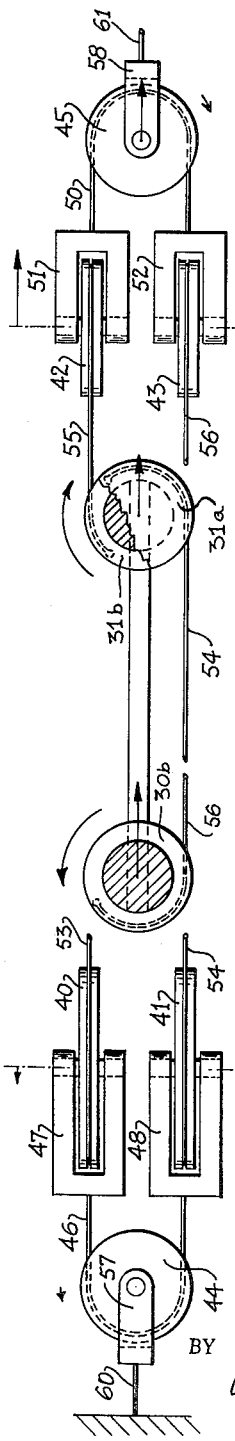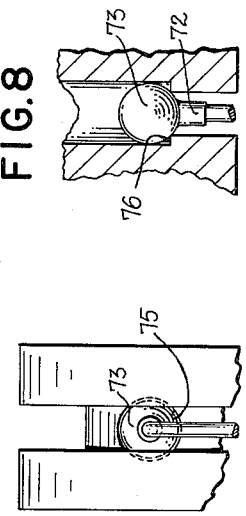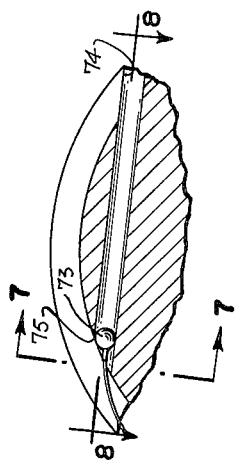

March 27, 1962   R. G. HILL ET AL   3,026,720
PURE BENDING TEST MACHINE
Filed Feb. 24, 1959   3 Sheets-Sheet 3

INVENTOR.
RONALD G. HILL
EDWIN J. ZAPEL
BY Barnes + Seed
ATTORNEYS

United States Patent Office 3,026,720
Patented Mar. 27, 1962

3,026,720
PURE BENDING TEST MACHINE
Ronald G. Hill, 1036 W. Nickerson, and Edwin J. Zapel, 7924 15th Ave. SW., both of Seattle, Wash.
Filed Feb. 24, 1959, Ser. No. 795,240
8 Claims. (Cl. 73—100)

The present invention relates to a machine for testing the properties of materials by producing a pure bending moment in a specimen thereof.

The deflected shape of a beam of constant section subjected to pure bending is a circular arc of constant radius. This radius is a function of the bending moment and the effective stiffness of the section. Hence, it is of tremendous value in establishing the modulus of elasticity for tension and compression of a test specimen of a given material to be able to progressively subject it to pure bending while measuring the resulting radii of curvature.

Accordingly, the present invention aims to provide a machine of simple and economical construction which will produce a controlled pure bending moment in a specimen. The invention further aims to provide a machine which will accurately subject a specimen to alternating pure bending moments.

The above and other objects and advantages in view will appear and be understood in the course of the following description and claims, the invention consisting in the novel construction and in the adaptation and combination of parts hereinafter described and claimed.

In the accompanying drawings:

FIG. 4 is a diagrammatic plan view of a further advanced embodiment of our invention.

FIG. 5 is a longitudinal sectional view with parts broken away taken as indicated by the line 5—5 of FIG. 4.

FIG. 6 is an enlarged fragmentary transverse sectional view through one of the pulley runs of a load head illustrating a means of anchoring a pull line.

FIG. 7 is a front elevational view of the ferrule of FIG. 6, and taken as shown by line 7—7 therein.

FIG. 8 is a sectional view taken along the line 8—8 of FIG. 6.

Figure 1:
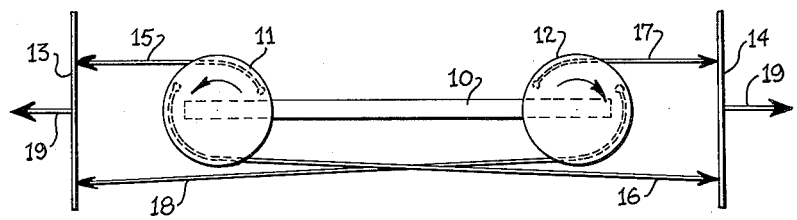
FIG. 1 is an elevational diagrammatic view illustrating a basic concept of our invention.

Referring to the drawings, in FIG. 1 we have illustrated schematically the basic concept of our invention. It is seen that a pair of coplanar load heads 11—12 of generally pulley configuration grip the ends of a specimen 10. Each load head has two pulley load lines which are anchored thereto and to a pair of load bars 13—14. In the case of head 11 a line 15 passes from the top of the head to the bar 13 and a line 16 travels from the under side of the head and beneath the other head 12 to the lower end of the bar 14. Similarly, the load head 12 has an upper line 17 connected to the respective end of bar 14 and a lower line 18 passing beneath head 11 to connect with the lower end of bar 13. It will be apparent that when opposite alined forces 19—19 are applied to the load bars 13—14, the lines 15–18 will initially be equally loaded. As a result the heads 11—12 will be urged to turn about their center axes as indicated by the arrows, thereby applying equal and opposite force couples on the ends of the specimen 10.

Figure 2:
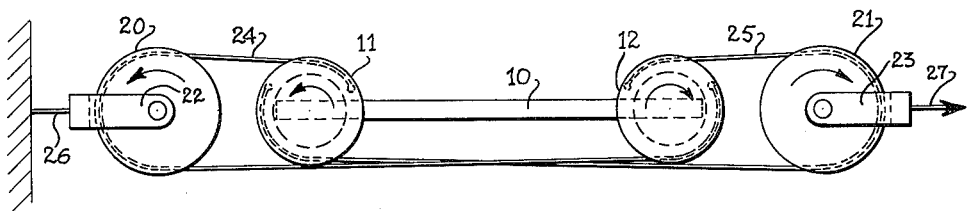
FIG. 2 is an elevational diagrammatic view showing a more advanced state of the invention.

An improved arrangement of the FIG. 1 concept is illustrated in FIG. 2 wherein the load bars 13—14 have been replaced by load pulleys 20—21 provided with clevises 22—23. The four lines 15, 18 and 16, 17 are merged into a pair of load lines 24—25 working on the load pulleys 20—21, respectively, and thus each of these lines is anchored to both load heads 11—12. This guarantees an equal loading of the load heads when the clevises 22—23 are forced apart, and particularly when one of them is anchored as at 26 while the other is pulled at 27 away from the anchor support.

Figure 9:
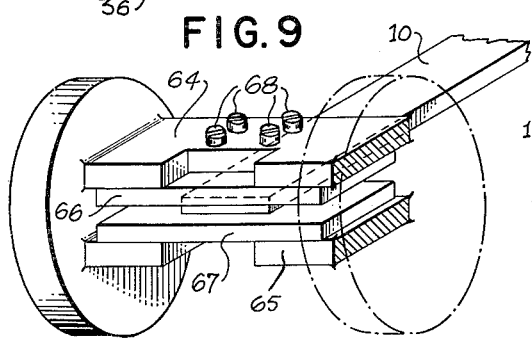
FIG. 9 is a perspective detail view of one of the clamping means on the load heads.

It will be noted, however, that in the FIGS. 1 and 2 embodiments there is respective conflict between the lower pull lines 16, 18 and between the lower runs of the lines 24, 25 making it impossible for all portions of the pull lines in each embodiment to remain coplanar at all times. The embodiment shown in FIG. 3 remedies this problem by the use of double load heads 30—31 and dual load pulleys 32—33 instead of the single pulley heads 11—12 and the single run pulleys 20—21, respectively. The heads 30—31 are identical and their inner and outer pairs of pulleys are rigidly interconnected and denoted by the suffix letters a—b. As shown in FIG. 9 the inner pulleys of each head are rigidly mounted at the ends of spaced stationary jaw plates 64—65. A pair of removable jaw shims 66—67 is located between these jaws and one or both of the shims is engaged by locking bolts 68 threaded through the respective jaw plate to force the shims toward one another. Thus to lock a specimen 10 in place after its ends have been placed between the jaws of the load heads it is only necessary to insert the shims 66—67 of approximately the thickness necessary to fill any gap between the specimen and the jaw plates and then tighten down on the locking bolts 68, thereby clamping the specimen between the shims.

The pairs of pulley runs 32, 30a, and 31a should be spaced apart laterally speaking a common distance and all should have the same diameter. Likewise, the runs 33, 30b, and 31b should have an equal lateral spacing and a common diameter. Thus, for ease of manufacture all of these pulley runs may be of the same size.

Two pairs of pull lines 34—34 and 35—35 are used, such pairs corresponding to the single lines 24—25, respectively, in FIG. 2. Accordingly, the lines 34 are anchored to pulleys 30a, pass over load pulleys 32 and double back beneath pulleys 30a to be anchored by their other ends to pulleys 31a. In the same manner the lines 35 are anchored to the pulleys 30b, 31b and double around the load pulleys 33. As before, the load pulleys are provided with clevises 36, 37 so that a centered load 38 can be easily applied to one end of the machine while the other end is anchored at 39. Upon application of the load, all of the pulley runs 32, 30a, and 31a and the pulley runs 33, 31b, and 30b assume respective perfect alinements which are centered relative to a load plane which is parallel to the pulleys and passes through the anchor 39 and direction of the applied load 38. It is believed obvious that as the load 38 is continued the load heads 30—31 will be responsively forced to turn equally in opposite directions so that the specimen is subjected to pure bending.

Figure 3:
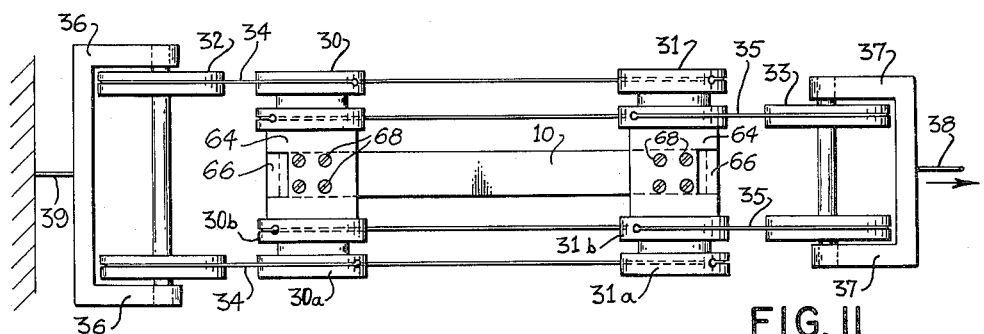
FIG. 3 is a diagrammatic plan view illustrating the FIG. 2 version carried out into a double-headed arrangement.

It is possible that the pull lines at opposite sides of our machine of the FIG. 3 embodiment will not stretch equal amounts under load. Accordingly, in FIGS. 4–5 we have shown a further modified bending machine providing automatic correction for such a stretching factor. In this machine pairs of balancing pulleys 40—41 and 42—43 have been introduced which are at right angles to the load heads, and single loading pulleys 44—45 are used at the ends of the machines. Load pulley 44 operates by a balancing line 46 with clevises 47—48 for the balancing pulleys 40—41 while load pulley 45 has a balancing line 50 connected to clevises 51—52 on the other balancing pulleys 42—43.

Instead of having two pairs of pull lines which operate in the same planes as the pulleys of the load heads as in the case of the lines 34—35 in FIG. 3, the embodiment of FIG. 5 has two pairs of pull lines 53—54 and 55—56 with their runs defining planes perpendicular to such planes of the load heads. To elaborate, the lines 53—54 take over the function of the upper and lower runs, respectively, of the pull lines 34 by being anchored, one to the pulleys 30a and the other to the pulleys 31a while passing around respective of the balancing pulleys 40—41. In like manner the upper and lower runs of the lines 35 become, respectively, the lines 55—56. These operate on the balancing pulleys 42—43.

It will be apparent that the loading pulley 44 must have the same diameter as the pulleys 30a—31a and that the loading pulley 45 must correspond in size to the pulleys 30b—31b. Similarly the pairs of balancing pulleys 40—41 and 42—43 should have their groove diameters equal, respectively, to the center-to-center lateral spacing between the outer two pulleys of the load heads 30—31 and between the inner two pulleys thereof. The loading pulleys 44—45 are also equipped with respective clevises 57—58, for an anchor line 60 and a loading line 61.

In FIG. 5 we have inclined vectors to show relative movement of the parts responsive to the exerting of a pull on the loading line 61. From these it can be seen that the load heads 30—31 undergo equal and opposite rotation while the head 30 moves in the lineal direction of pull faster than the head 31. As a consequence the specimen 10 is subjected to equal and opposite force couples on its end portions causing it to partake of pure bending. The changing radius of curvature of the specimen as it bows upwardly responsive to continued loading can be readily determined.

During the loading of the specimen there will be no rotation of the four balancing pulleys 40–43 unless their respective lines stretch unequal amounts on both sides of the machine. If unequal stretch does occur in one of the lines 53–56, the respective balancing pulley will responsively turn and thereby maintain an equal loading of both ends of the load head to which the stretched line extends.

For purposes of clarity of illustration, in the drawings the pulleys of the load heads 30—31 have not been shown as grooved along the full circumference and the anchored ends of the pull lines 53–56 are shown as wrapped on the respective pulley runs of the load heads different amounts so that all of the anchored ends can be viewed in FIG. 4. In actual practice the pulleys are completely grooved and the pull lines 53–56 given slightly less than a half turn on their respective pulley runs. This permits nearly 180 degree bending of the specimen, more than is normally required. However, it is to be understood that if more bending were desired, the four pairs of pulley runs 30a—30a, 30b—30b, 31a—31a, and 31b— 31b, could be placed in four respective different pairs of parallel planes all centered relative to a common plane to be occupied by the pull line 61.

In this latter regard, it is not necessary that the anchoring and loading lines 60, 61 operate on the balancing lines 46, 50 by single loading pulleys 44, 45.

Figure 13:
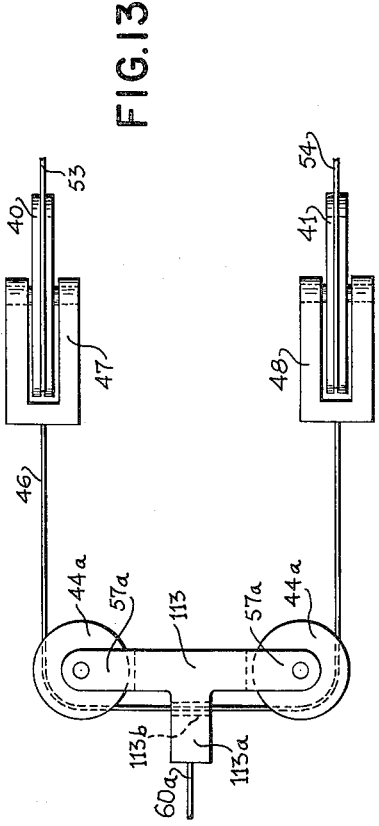
FIG. 13 illustrates in plan view an alternative balancing arrangement to that shown in FIGS. 4–5.

Alternatively, as shown in FIG. 13 for the anchoring and balancing lines 60—46, this single loading pulley function can be assumed by a pair of pulleys 44a mounted in clevises 57a provided at the ends of a load bar 113. The latter has a central leg 113a which is connected at its free end to the anchoring or loading line and has a transverse bore 113b for passage of the respective balancing line. This modified arrangement permits the load heads 30—31 to be elongated without requiring the use of relatively large balancing pulleys.

Figure 10:
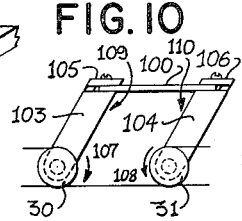
FIGS. 10 and 11 are schematic side and top plan views, respectively, showing a modified specimen location relative to the load heads.
Figure 11:
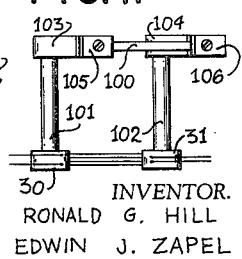

For purposes of example we have shown the specimen in FIGS. 1–5 as being clamped at the centers of the load heads 30—31. It is to be expressly understood that this arrangement is not necessary and that the only requirements are that the specimen be rigidly clamped with respect to the load heads and occupy a plane which is parallel to the pulley runs of the load heads. To be more specific, in FIGS. 10–11 we have shown schematically a possible position of a specimen 100 relative to the load heads 30—31. In this example the load heads have axial extensions 101—102 of equal length to which are connected lever arms 103—104 of unequal length and which are in a common plane at right angles to the axial extensions. These arms have clamps 105—106 at their upper ends receiving the ends of the specimen. It will be apparent that equal and opposite force couples exerted by our machine on the load heads 30—31 as illustrated by the arrows 107—108 will result in like couples 109—110 at the ends of the specimen 100.

Figure 12:
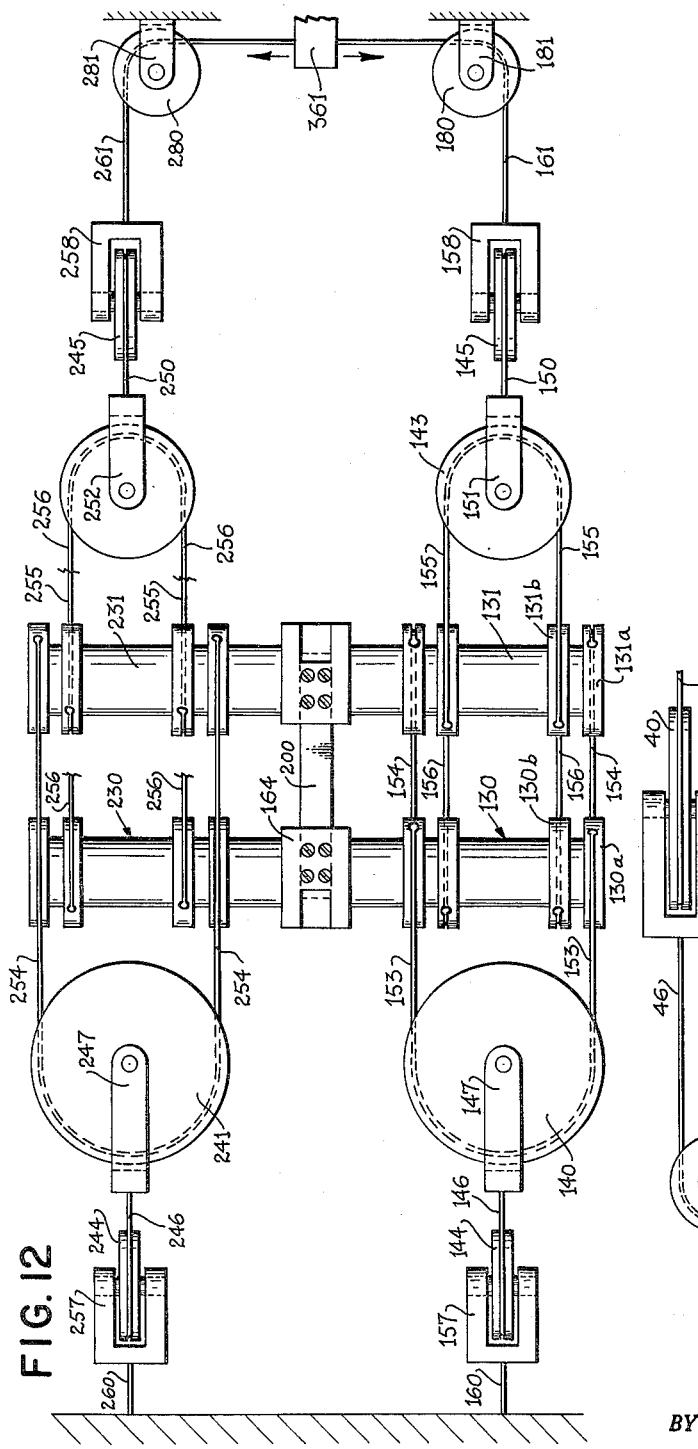
FIG. 12 is a diagrammatic plan view of an alternating bending machine made in accordance with the teachings of our invention.

In many cases, as for example in fatigue testing, it is desired to subject a specimen to alternating bending, and for this purpose we have illustrated in FIGURE 12 a side-by-side arrangement of two bending machines of the type illustrated in FIGURES 4–5. For clarity of comparison, parts in the two halves of this alternating bending device which correspond to parts in the FIGURE 4–5 machine have been given corresponding numbers in the 100 and 200 series. In this manner, by particularly comparing FIGURE 12 with FIGURE 4, it can be seen that the lower half of the alternating bending machine is positioned the same as the FIGURE 4–5 machine, and that the upper half thereof is merely an inversion of such machine. The load heads 130—230 and 131—231 of these two halves are rigidly connected together by suitable extensions which provide clamps 164 for a specimen 200. These clamps may be of the type illustrated in FIGURE 9.

The lines 160—260 are anchored as before whereas the loading lines 161—261 pass a quarter turn around a pair of guide pulleys 180—280 which are anchored and journaled by clevises 181—281. From these guide pulleys the loading lines extend to connections with a pivoted reciprocating loading arm 361 which is powered back and forth in any suitable manner. It can be readily seen that as this loading arm reciprocates the loading lines 161—261 are responsively alternately tensioned and slackened, and that as a result the specimen 200 is alternately subjected to pure bending by the opposite action of the two halves of the machine whose individual operation has been hereinbefore described.

The ends of the pull lines can be anchored in various ways. As illustrated in FIGS. 6–8, we have found it very satisfactory to crimp a ferrule 72 having a bulbar head 73 over the end of the pull line and to seat the head 73 in a pocket of greater width than the pulley groove and exposed to such groove. Such a pocket can be readily formed by boring a hole 74 of greater diameter than the width of the pulley groove as a chord of the groove's circle starting at the rim of the pulley but stopping as the hole intersects the groove at its other end by an opening 75. At both sides of this opening there results shoulders 76 which are engaged by the head 73 when the ferrule 72 is seated with the pull line projecting through the opening 75 to seat in the pulley groove.

It is thought that the invention will have been clearly understood from the foregoing detailed description. Changes will suggest themselves and may be resorted to without departing from the spirit of the invention, wherefore it is my intention that no limitations be implied and that the hereto annexed claims be given a scope fully commensurate with the broadest interpretation to which the employed language admits.

What we claim is:

1. In a pure bending test machine, a pair of pulley-like load heads having parallel spaced axes of rotation, clamping means mounted on said load heads for holding a specimen in a load bending plane which is perpendicular to the center plane defined by said axes, said load heads and their respective clamping means being bodily movable relative to one another in said center plane, a first pair of parallel spaced pull lines anchored to a first of said load heads and extending therefrom in a first direction, a second pair of parallel spaced pull lines anchored to said first load head and extending therefrom diametrically opposite said first pair and in a second direction opposite to said first direction, a third pair of parallel spaced pull lines anchored to the other of said load heads and extending therefrom coplanar to said first pair and in said second direction, a fourth pair of parallel spaced pull lines anchored to said other load head and extending therefrom coplanar to said second pair and in said first direction, said four pairs of pull lines each being parallel to said load bending plane and means for equally tensioning said pull lines.

2. In a pure bending test machine, a pair of pulley-like load heads having parallel spaced axes of rotation, clamping means mounted on said load heads for holding a specimen in a load bending plane which is perpendicular to the center plane defined by said axes, said load heads and their respective clamping means being bodily movable relative to one another in said center plane, first, second, third, and fourth balancing pulleys parallel to said center plane, a first pull line around said first balancing pulley and having parallel runs anchored to a first of said load heads, a second pull line around said second balancing pulley and having parallel runs anchored to the other of said load heads, means for pulling said first and second balancing pulleys in a first direction, a third pull line around said third balancing pulley and having parallel runs anchored to said other load head, a fourth pull line around said fourth balancing pulley and having parallel runs anchored to said first run, and means for pulling said third and fourth balancing pulleys oppositely to said first direction.

3. In a pure bending test machine, a pair of pulley-like load heads having parallel spaced axes of rotation, clamping means mounted on said load heads for holding a specimen in a load bending plane which is perpendicular to the center plane defined by said axes, said load heads and their respective clamping means being bodily movable relative to one another in said center plane, first, second, third, and fourth balancing pulleys parallel to said center plane, a first pull line around said first balancing pulley and having parallel runs anchored to a first of said load heads, a second pull line around said second balancing pulley and having parallel runs anchored to the other of said load heads, first and second clevises receiving said first and second balancing pulleys, respectively, a third pull line around said third balancing pulley and having parallel runs anchored to said other load head, a fourth pull line around said fourth balancing pulley and having parallel runs anchored to said first run, third and fourth balancing pulleys, respectively, a first loading pulley having a line therearound anchored at its ends to said first and second clevises and having a clevis, a second loading pulley having a line therearound anchored at its ends to said third and fourth clevises, and means for pulling said clevises of said first and second loading pulleys away from one another.

4. In a pure bending test machine, a pair of spaced pulley-like load heads clamped to the ends of a specimen and free to move bodily relative to one another in a given plane, four pairs of parallel pull lines anchored to said load heads, two pairs to each head, the lines of each said pair being anchored to the same respective head at axially spaced points and occupying a plane at right angles to said given plane, and means for pulling each of said lines with equal forces to turn said load heads in opposite directions by like torques.

5. The structure of claim 4 in which multiple pulley means parallel to the axes of said load heads is operatively associated with said pull lines for balancing the stretch of the lines of each said pair.

6. In an alternating pure bending test machine, a pair of pure bending devices located side-by-side and operatively connected together, one of said devices being inverted with relation to the other whereby said devices operate oppositely, each of said devices comprising a pair of pulley-like load heads having parallel spaced axes of rotation, first, second, third, and fourth balancing pulleys parallel to said center plane, a first pull line around said first balancing pulley and having parallel runs anchored to a first of said load heads, a second pull line around said second balancing pulley and having parallel runs anchored to the other of said load heads, first and second clevises receiving said first and second balancing pulleys, respectively, a third pull line around said third balancing pulley and having parallel runs anchored to said other load head, a fourth pull line around said fourth balancing pulley and having parallel runs anchored to said first run, third and fourth balancing pulleys, respectively, a first loading pulley means having a balancing line therearound anchored at its ends to said first and second clevises, a second loading pulley means having a balancing line therearound anchored at its ends to said third and fourth clevises, means for anchoring the first loading pulley means of said devices in parallel relation, means for alternatively pulling the second loading pulley means of said devices in parallel relation, and clamping means mounted on said load heads of said devices for holding a specimen in a load bending plane which is perpendicular to the plane which is defined by said axes of rotation, said load heads and their respective said clamping means being bodily movable relative to one another in said last named plane.

7. In a pure bending test machine, a pair of pulley-like load heads having parallel spaced axes of rotation, clamping means mounted on said load heads for holding a specimen in a load bending plane which is perpendicular to the center plane defined by said axes, said load heads and their respective clamping means being bodily movable relative to one another in said center plane, first, second, third, and fourth balancing pulleys parallel to said center plane, a first pull line around said first balancing pulley and having parallel runs anchored to a first of said load heads, a second pull line around said second balancing pulley and having parallel runs anchored to the other of said load heads, first and second clevises receiving said first and second balancing pulleys, respectively, a third pull line around said third balancing pulley and having parallel runs anchored to said load heads, a fourth pull line around said fourth balancing pulley and having parallel runs anchored to said first run, third and fourth balancing pulleys, respectively, a first loading pulley means having a balancing line therearound anchored at its ends to said first and second clevises, a second loading pulley means having a balancing line therearound anchored at its ends to said third and fourth clevises, and means for pulling said first and second loading pulley means away from one another.

8. The structure of claim 7 in which said first and second pulley means each comprises an elongated member having a pair of pulleys at opposite ends thereof around which the respective said balancing line operates.

References Cited in the file of this patent

UNITED STATES PATENTS 2,327,139   Scott _____ Aug. 17, 1943

FOREIGN PATENTS 605,093   Germany _____ Nov. 3, 1934
632,286   Germany _____ July 6, 1936
725,620   Germany _____ Sept. 25, 1942